(No Model.)
A. A. CUSHMAN & G. W. STINEBRING.
FRICTION CLUTCH.
No. 442,308. Patented Dec. 9, 1890.
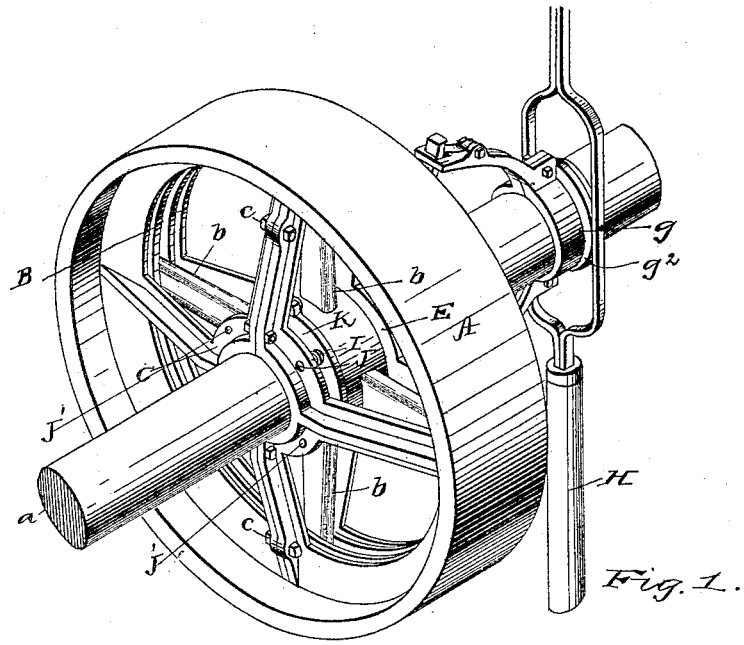
Fig. 1.
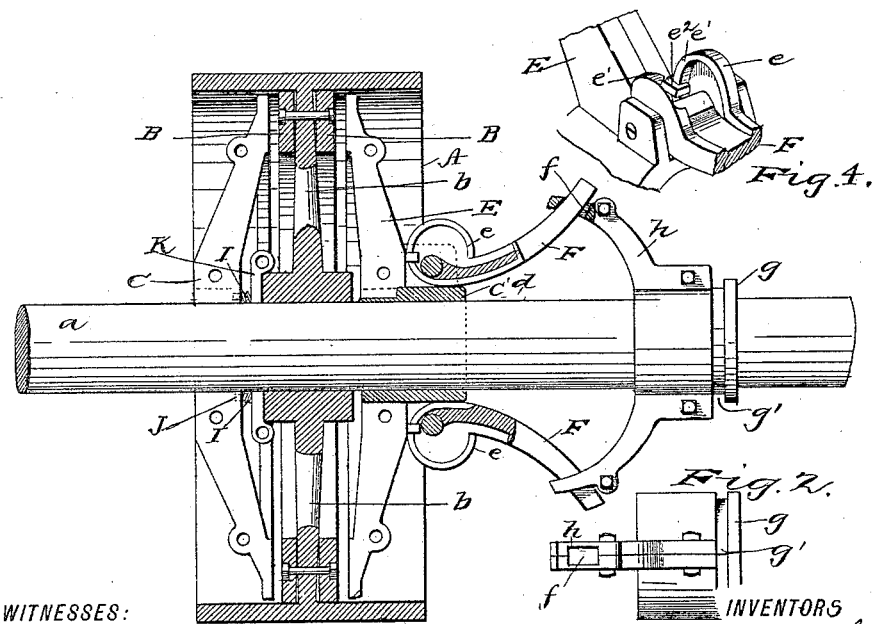
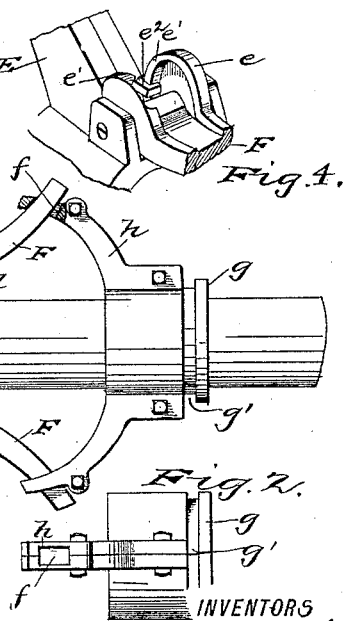
Fig. 4.
Fig. 2.
Fig. 3.
WITNESSES:
INVENTORS
Amos A. Cushman
George W. Stinebring
BY Fred W. Bond
ATTORNEY.

UNITED STATES PATENT OFFICE.

AMOS A. CUSHMAN AND GEORGE W. STINEBRING, OF SHREVE, OHIO.

FRICTION-CLUTCH.

SPECIFICATION forming part of Letters Patent No. 442,308, dated December 9, 1890.

Application filed April 21, 1890. Serial No. 348,803. (No model.)

*To all whom it may concern:*

Be it known that we, AMOS A. CUSHMAN and GEORGE W. STINEBRING, citizens of the United States, residing at Shreve, in the county of Wayne and State of Ohio, have invented certain new and useful Improvements in Friction-Clutches; and we do hereby declare that the following is a full, clear, and exact description of the same, reference being had to the annexed drawings, making a part of this specification, and to the letters of reference marked thereon, in which—

Figure 1 is an isometrical view showing the pulley and its different parts properly attached to a shaft. Fig. 2 is a sectional view of the pulley, showing its different parts. Fig. 3 is a detached view of one of the operating-arms or a portion of the yoke. Fig. 4 is a view showing the eccentric.

The present invention has relation to friction-clutches; and it consists in the different parts and combination of parts hereinafter described, and particularly pointed out in the claims.

Similar letters of reference indicate corresponding parts in all of the figures of the drawings.

In the accompanying drawings, A represents the pulley proper, which is loosely mounted on the shaft $a$. This pulley may be of the solid kind, or, if desired, may be a split pulley.

To the spokes $b$ are securely attached, in any convenient and well-known manner, the friction bands or rings B, said rings or bands being located near the inner periphery of the pulley A, substantially as illustrated in Fig. 2. To the shaft $a$ is securely attached the clamp C, and it is so secured or attached that it will not move or slide upon the shaft $a$.

For the purpose of attaching the clamp C to shafts having pulleys already located thereon, said clamp is formed in sections and the sections securely attached together by means of bolts $c$ or their equivalents. Upon the opposite side of the pulley A is located the clamp E, which is like the clamp C, and is so adjusted that it will slide or move back and forth on the hub C'. The hub C' is preferably formed in sections, and securely clamped or attached to the shaft $a$ by means of bolts or in any other convenient and well-known manner.

For the purpose of causing the clamp E to rotate with the hub C', a key is attached to the clamp E, which is received in a key-seat located on the periphery of the hub C'.

To the hub C' are pivotally attached the eccentric-arms F, which arms are located substantially as shown in Fig. 2, and, as shown, are provided upon their inner portions with the eccentrics $e$. These eccentrics are for the purpose of pressing against the outer side of the clamp E, for the purpose hereinafter described. The grooved collar $g$ is loosely mounted on the shaft $a$, by means of bolts or in any other convenient and well-known manner, and is so adjusted that it will slide back and forth on the shaft $a$. This collar $g$ is provided with the yoke $h$, said yoke being provided with the slots or apertures $f$, which are for the purpose of receiving and operating the eccentrics $e$ by means of the arms F.

It will be understood that as the collar $g$, together with its yoke $h$, is forced toward the pulley A the outer ends of the eccentric-arms F will be forced away from each other, thereby causing the eccentrics $e$ to crowd or force the clamp E against one of the friction-rings B, which causes the pulley A to be forced over against the friction-clamp C, thereby clamping and holding the pulley A between the friction-clamps C and E, thus causing the pulley A to rotate with the shaft $a$. The collar $g$ and its yoke $h$ are operated by means of the handle H, which handle is attached to the collar $g$ by means of the groove $g'$ and the yoke $g^2$. It will be understood that the top or upper end of the yoke $g^2$ should be pivoted to some fixed point, such as a joist or other object.

When it is desired to loosen the pulley A, the handle H is forced away from the pulley, thereby moving the collar $g$, together with its yoke $h$, away from the pulley A, which releases the eccentrics $e$ from the clamp E, said clamp E being drawn from the friction-ring B by means of the flange $e'$ and the hooked extension $e^2$. The pulley A is forced away from the clamp C by means of the springs I, thereby leaving the pulley A entirely free on the shaft $a$ and out of contact with the clamps C and E. For the purpose of causing the pulley A to be moved away from and out of contact with the fixed clamp C the springs I are provided, which springs are located around the pins J. The pins J are securely attached to the washer K, which washer is mounted on the shaft $a$ by means of bolts or in any other convenient and well-known manner. One end of the pins J is entered into the apertures J′, thereby causing the washer K to revolve with the clamp C, which causes the pins J and their apertures to register at all times.

It will be understood that by forming the clamps C and E, the hub C′, and the collar $g$ and the washer K in sections all of said parts can be attached to a shaft and properly located without removing the pulleys, which are already located on the shaft.

For the purpose of attaching the friction bands or rings B to pulleys without removing the pulleys from the shaft said bands or rings are formed in sections and the sections attached to the spokes or sides of a pulley, as it will be understood that our device can be attached and successfully operated upon solid wood pulleys.

The hooked extensions $e^2$ are securely attached to the clamp E, or, if desired, said hooked extensions may be formed integral with the clamp-sections E.

It will be understood that by placing the clamps C and E on each side of the pulley A the pressure will be equal against each side of the pulley, and thereby prevent any strain or twist of the pulley and at the same time giving double the amount of friction to the pulley A.

Having fully described our invention, what we claim as new, and desire to secure by Letters Patent, is—

1. The clamp C, fixed to the shaft $a$, the pulley A, loosely mounted on the shaft $a$, the hub C′, the clamp E, mounted on said hub, the grooved collar $g$, provided with the yoke $h$, having the slots $f$, and the arms F, provided with the eccentrics $e$, substantially as and for the purpose set forth.

2. The combination of the shaft $a$, having loosely mounted thereon the pulley A, the washer K, loosely mounted on the shaft and provided with the pins J, the springs I, located around the pins J, the fixed clamp C, provided with the apertures J′, the friction bands or rings B, attached to the pulley A, the clamp E, loosely mounted on the hub C′, and the collar $g$, mounted on the shaft and provided with the yoke $h$ and the arms F, and mounted upon hub C′ and provided with the eccentrics $e$, substantially as and for the purpose specified.

3. The combination of the shaft $a$, having loosely mounted thereon the pulley A, the clamps C and E, the friction-rings or bands B, fixed to the pulley A, the collar $g$, mounted on the shaft $a$ and provided with the yoke $h$, the arms F, provided with the eccentrics $e$, having the flanges $e'$, and the hooked extensions $e^2$, substantially as and for the purpose specified.

In testimony that we claim the above we have hereunto subscribed our names in the presence of two witnesses.

AMOS A. CUSHMAN.
GEORGE W. STINEBRING.

Witnesses:
L. T. CORNELL,
LORENZO D. CORNELL.